H. J. LIST.
NON-SKID DEVICE.
APPLICATION FILED JULY 27, 1917.
1,267,676.
Patented May 28, 1918.
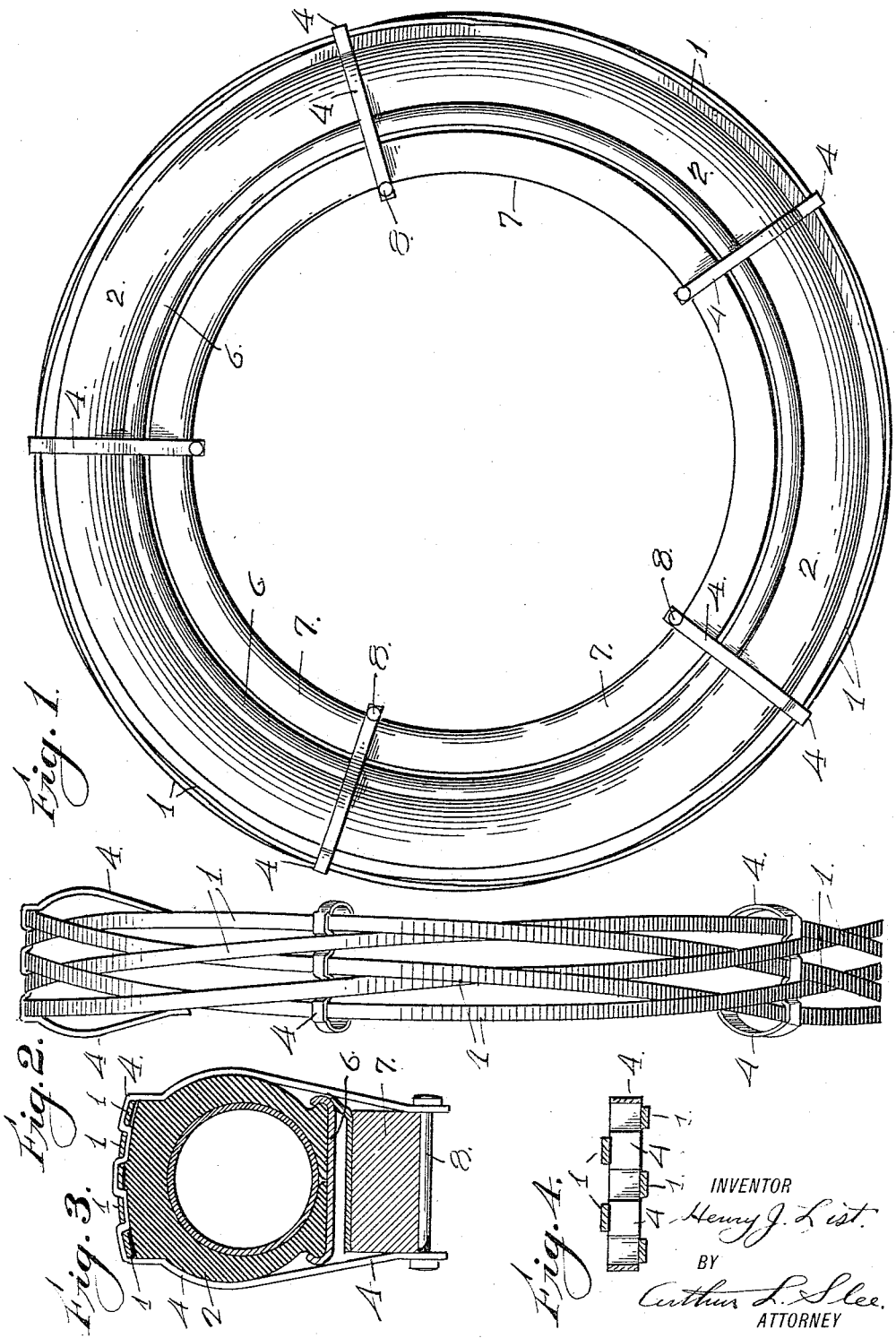
INVENTOR
Henry J. List.
BY
Arthur L. Slee.
ATTORNEY

UNITED STATES PATENT OFFICE.

HENRY J. LIST, OF SAN FRANCISCO, CALIFORNIA.

NON-SKID DEVICE.

1,267,676.  Specification of Letters Patent.  Patented May 28, 1918.

Application filed July 27, 1917. Serial No. 183,194.

*To all whom it may concern:*

Be it known that I, HENRY J. LIST, a citizen of the United States, residing in the city and county of San Francisco and State of California, have invented a certain new and useful Improvement in Non-Skid Devices, of which the following is a full, clear, and exact description, such as will enable others skilled in the art to which it appertains to make and use the same.

The present invention relates to a non-skid device for vehicle tires wherein a series of interwoven rings operate in conjunction with detachable clamps to prevent a lateral and longitudinal movement of the tire relatively to the pavement; and the objects of my invention are—

First, to provide an improved non-skid device for vehicle tires;

Second, to provide an improved device of the character described that may be easily and quickly detached from or attached to vehicle tires;

Third, to provide an improved device of the character described that shall be simple and cheap in construction and operation and having a maximum efficiency;

Fourth, to provide an improved device of the character described having improved means for effectively and detachably securing the device upon the periphery of a vehicle tire.

Fifth, to provide a non-skid device comprising a series of interwoven rings arranged to prevent lateral and longitudinal skidding.

I accomplish these several features by means of the preferred form of the device disclosed in the drawings forming a part of the present specification wherein like characters of reference are used to designate similar parts throughout the said specification and drawings, and in which—

Figure 1 is a side elevation of a mounted vehicle tire with my improved non-skid device applied thereto;

Fig. 2 is an end elevation of the device removed from the tire;

Fig. 3 is an enlarged transverse sectional view through the rim, felly and casing disclosing the manner in which the non-skid device is detachably secured or mounted upon the tire; and Fig. 4 is an enlarged transverse sectional view of the device with one of the clamping members turned to a position for removing the device from a tire.

Referring to the drawings the numeral 1 is used to designate a series of rings interwoven to bring diametrically opposed points within the same ring on opposite sides of the mid-plane of a tire or casing 2 as disclosed in Fig. 2 of the drawings. That is, instead of lying parallel to the plane of the tire 2 the rings 1 are inclined relatively to the mid-plane of said tire 2 so that when there is a tendency on the part of the tire to move laterally in either direction the friction of the pavement on the rings will tend to pull the opposite side of the ring more tightly onto the tire and thereby practically bind said tire to the road.

As there are substantially five or more rings it is evident that there will be approximately ten points around the periphery of the tire 1 where the rings 1 intersect each other for the reason that each ring intersects each of the other rings at two points or places. Consequently one of the ten intersections will be at or adjacent to the point of contact of the tire with the pavement.

The rings 1 are detachably secured upon the periphery of the tire casing 2 by means of U-shaped clamps 4 which are interwoven transversely with the rings 1 at regular intervals and embrace the side of the tire casing 2, the rim 6 and the felly 7.

Suitable bolts 8, or any other suitable fastening devices, engage the ends of the U-shaped clamps 4 to clamp the ends of said clamps 4 tightly against the sides of the said tire 2 and the felly 7 of the wheel.

In detaching or removing the rings 1 the bolts 8 are first removed from the ends of the clamps 4 and said clamps 4 are then rotated through an arc of approximately 90 degrees to lie substantially parallel with the rings 1. As there will then be no inwardly extending clamps the rings 1 may be readily removed sidewise from the tire 2. When in this position the clamps 4, being interwoven with the rings 1, will appear standing edgewise between alternate rings 1 as disclosed in Fig. 4 of the drawings. The tension of the rings 1 will tend to retain the clamps 4 in a position substantially parallel with said rings 1 to facilitate removal of the same from the tire 2.

The portion of the clamps 4 lying beyond the tread of the tire 2, being transversely arranged, will tend to prevent a longitudinal movement of the tire 2 relatively to the pavement.

Briefly, the peripheral or longitudinal disposition of the interwoven rings 1 operates in conjunction with the transverse arrangement of the exposed portions of the transverse clamps 4 to prevent longitudinal and lateral movement of the tire 1 relatively to the pavement.

It is obvious from the foregoing that I have provided an improved non-skid device for vehicle tires that is not only simple, cheap and effective in construction and operation but which may also be easily and readily attached or detached.

It is also evident that I have provided an improved non-skid device adapted to prevent a longitudinal and lateral movement of the tire relatively to a pavement thereby preventing excessive wear on the tread of the tire and increasing the life of said tire.

Having thus described my invention what I claim as new and desire to secure by Letters Patent is—

1. A non-skid device for vehicle tires comprising a series of metallic rings interwoven to bring diametrically opposed points of each ring on opposite sides of the midplane of the tire; and means for detachably securing the rings to a vehicle tire.

2. A non-skid device for vehicle tires comprising a series of metallic rings interwoven to bring diametrically opposed points of each ring on opposite sides of the midplane of the tire; and clamps transversely interwoven with the rings and arranged to detachably secure said rings onto a tire.

3. A non-skid device for vehicle tires comprising a series of metallic rings interwoven to bring diametrically opposed points of each ring on opposite sides of the midplane of the tire; and transverse clamps detachably interwoven with the rings to detachably secure said rings on a tire.

In witness whereof I hereunto set my signature.

HENRY J. LIST.

Copies of this patent may be obtained for five cents each, by addressing the "Commissioner of Patents, Washington, D. C."